United States Patent [19]

Fujiwara et al.

[11] Patent Number: 4,502,112
[45] Date of Patent: Feb. 26, 1985

[54] SEQUENCE CONTROL APPARATUS

[75] Inventors: Katsuhiro Fujiwara; Kazuyoshi Osako, both of Narashino, Japan

[73] Assignee: Hitachi, Ltd., Tokyo, Japan

[21] Appl. No.: 284,341

[22] Filed: Jul. 17, 1981

[30] Foreign Application Priority Data

Jul. 18, 1980 [JP] Japan ................................. 55-97554

[51] Int. Cl.³ .............................................. G06F 3/00
[52] U.S. Cl. .................................................. 364/200
[58] Field of Search ....................... 364/200 MS File, 364/900

[56] References Cited

U.S. PATENT DOCUMENTS 4,159,516  6/1979  Henrion et al. ..................... 364/200

OTHER PUBLICATIONS

"Microprocessors & Microcomputers", Givone et al., 1980, p. 282.
Motorola—M6800 Microprocessor Applications Manual pp. 5-12, 5-34, 1975.

Primary Examiner—Eddie P. Chan
Assistant Examiner—Tim A. Wiens
Attorney, Agent, or Firm—Antonelli, Terry & Wands

[57] ABSTRACT

In a sequence control apparatus using a microprocessor performing its processing of operation in terms of one word as the unit therefor, a change indicating signal from a process condition detecting or measuring instrument connected to an I/O unit is taken into the microprocessor in a form combined with predetermined pattern data. With the resulting composite data, the contents of those bits of an accumulator in the microprocessor which do not correspond to the change indicating signal can be optionally processed.

8 Claims, 5 Drawing Figures

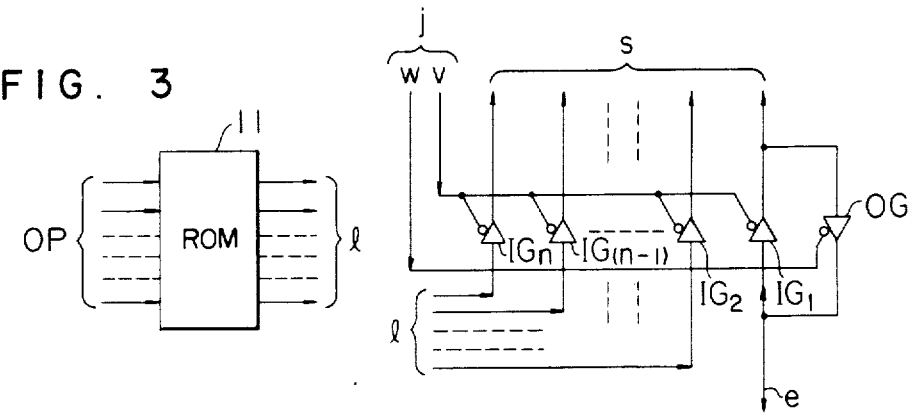
FIG. 3
FIG. 4
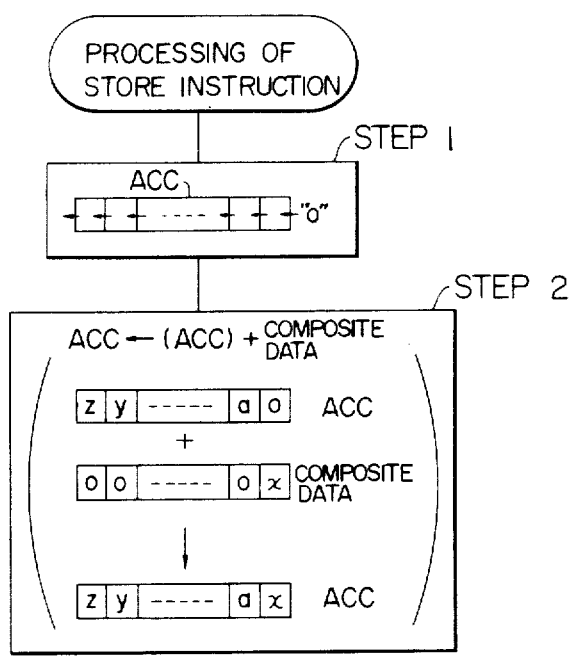
FIG. 5

SEQUENCE CONTROL APPARATUS

BACKGROUND OF THE INVENTION

1. Field of the Invention

The present invention relates to a sequence control apparatus, and more particularly to such an apparatus designed exclusively for sequence control in which the contents of control are determined by a program.

The variety of demands for sequence control apparatuses have increased with the development of automation. If one relies on electromagnetic relays or logic elements in order to fulfill such demands, the alteration of the contents of a control sequence makes it necessary to rewrite a complicated diagram for wiring on a relay or logic element board and to fabricate the corresponding new board. This results in lowered productivity in factories. Further, the fact that the alteration of the contents of control sequence is associated directly with a change in the contents of the hardware, causes various problems from the aspect of production control.

The contents of sequence control realizing a systematic running of a plant cannot be determined until the specifications of all instruments employed in the plant have been determined and the mutual relation between the instruments has been established. According to the conventional approach, therefore, the specification of the sequence control apparatus is determined in a final stage, followed by the design of the apparatus and the fabrication of the hardware required therefor. Thus, the sequence control apparatus is to bear the brunt of a severe restriction even in the fabrication process.

In view of the above problems, an approach has been proposed by which the hardware of a sequence control apparatus is standardized to allow the fabrication of identical hardwares on a production line of a factory while various requirements from users are settled by software. There has been widely used a programmable sequence control apparatus based on a stored program scheme in which a main part of the hardware is left unchanged for different sequence controls while the alteration of the contents of control operation is effected by modifying a program.

The present invention relates, in particular, to such a programmable sequence control apparatus using the stored program scheme.

2. Description of the Prior Art

A conventional sequence control apparatus of this sort includes as main parts thereof an input unit, an output unit, an operation control unit and a memory unit. The input unit is connected to an instrument (for example, a limit switch) for detecting the condition of a process to be controlled by the sequence controlling apparatus. The output unit is connected to a process controlling instrument (for example, an electromagnetic switch or a solenoid valve) which is controlled by the sequence control apparatus. For example, when a limit switch is activated in response to a change in a certain process, the change indicating signal is applied to the operation control unit of the sequence control apparatus through the input unit, and then collated with a predetermined control program stored in the memory unit to determine a required control action. As a result, a control signal is sent to the output unit so that a solenoid valve is closed. The contents of the sequence control operation to be performed are previously stored in the memory unit in the form of a program. When it is desired to store the program in the memory unit or to modify the contents of the program, an exclusive unit called a "program input unit" is connected to the memory unit and it is operated in accordance with a sequence chart.

The above-described kind of sequence control apparatus is designed exclusively for use in sequence control and therefore has functions which are intensively prepared to provide the best utilization for sequence control. Most of the instructions forming a program are suited to sequence control. For example, there are employed a STORE instruction, an AND instruction, an OR instruction, an AND/STORE instruction, an OR/STORE instruction, an OUTPUT instruction, and the like. The operation control unit is provided with an accumulator. A change indicating signal resulting from a change in a certain process, for example, the activation of a limit switch, is once entered in the accumulator through the input unit for collation with a predetermined control program stored in the memory unit. The contents of necessary control determined by the control program is once stored into the accumulator and then sent to the output unit as a control signal. The STORE instruction requires taking a change indicating signal from a predetermined process condition detecting instrument into the accumulator while transferring as an intermediate result, the result of the previous operation which has been stored in the accumulator before the taking of the change indicating signal thereinto, to a shift register prepared as a temporary memory unit. The AND instruction requires producing a logical product of the result of the previous operation stored in the accumulator and the change indicating signal newly taken from the predetermined process condition detecting instrument into the accumulator and returning the result of this logical operation to the accumulator to be stored therein. The OR instruction requires producing a logical sum of the result of the previous operation stored in the accumulator and the change indicating signal newly taken from the predetermined process condition detecting instrument into the accumulator and returning the result of this logical operation to the accumulator to be stored therein. Each of the AND instruction and the OR instruction does not act on the shift register serving as the temporary memory unit. The AND/STORE instruction requires producing a logical product of the result of the previous operation stored in the accumulator and the result of operation taken out of the shift register or temporary memory unit through a shifting of the latter and returning the result of this logical operation to the accumulator to be stored therein. The OR/STORE instruction requires producing a logical sum of the result of the previous operation stored in the accumulator and the result of operation taken out of the shift register or temporary memory unit through a shifting of the latter and returning the result of this logical operation to the accumulator to be stored therein. The OUTPUT instruction requires delivering the result of the previous operation stored in the accumulator.

The contents of sequence control determined by the control program is stored, as a sequence program including a proper combination of the above-mentioned instructions, into a memory unit by means of the program input unit.

The recent advance of microprocessors is remarkable and a sequence control apparatus using a microprocessor in its operation control unit has been widely used.

However, a serious problem arises when a microprocessor is incorporated in a sequence control apparatus. That is, the microprocessor uses one word as the unit for its processing of operation, one word being formed of a plurality of bits. On the other hand, the sequence control apparatus performing its processing of logical operations for a change indicating signal of logic "1" or "0" from a process condition detecting instrument, for example, a signal resulting from the ON or OFF action of a limit switch, uses one bit as the unit for the processing. An accumulator is incorporated in the microprocessor which performs the processing of operations in terms of the word unit formed of plural (usually, 4, 8, 16, etc.) bits, as is mentioned above. Therefore, the accumulator necessarily takes a bit arrangement which is the same in number as the plural bits forming one word.

When such a microprocessor performing its processing of logical operations in terms of the word unit formed of plural bits is applied to the sequence control apparatus, a change indicating signal of one bit from the process condition detecting instrument is passed through the input unit and then applied to an accumulator on a predetermined one-bit line of a plural-bit arranged data bus. Now, let us consider as an example the case where the STORE instruction is to be executed, namely, the change indicating signal from the instrument is stored into the accumulator through the predetermined one-bit line of the data bus. The microprocessor includes therein a one-bit carry storage area for temporarily storing a carry signal of the accumulator. According to one approach for processing the STORE instruction, the accumulator is first subjected to its shifting operation until the one-bit result of the previous operation stored in the accumulator is transferred to the carry storage area. In the case where a microprocessor is employed, the previously-mentioned shift register is formed by utilizing the shifting operation of the accumulator and a storage area at any predetermined address of a random access memory (hereinafter referred to as a RAM) provided for temporarily storing various data. When the result of the previous operation has been transferred to the carry storage area through the shifting operation of the accumulator, the contents stored at the predetermined address of the RAM provided as the storage area for the shift register are entered into the accumulator. Next, the result of the previous operation, which has been transferred to the carry storage area, is shifted to the accumulator to be stored therein while the contents of the accumulator are shifted. Then, the shifted contents of the accumulator are saved to the predetermined address of the RAM. Subsequently, the change indicating signal is taken into the accumulator. The STORE instruction can be realized through these steps.

Another possible approach utilizing the function of the accumulator for processing the STORE instruction is to allot the one-bit data of each of the change indicating signal and the result of the previous operation of the accumulator to one address of the RAM. A pointer register for indicating an address at which desired data is stored is allotted to a predetermined address of the RAM. The contents of the pointer register are changed as needed to execute the STORE instruction. In more detail, the pointer register is first advanced by one. Next, the result of the previous operation stored in the accumulator is transferred to the address of the RAM indicated by the pointer register. Then, the change indicating signal passed through the input unit is stored into the accumulator.

Both of the above-mentioned approaches have such drawbacks as mentioned below. The former approach utilizing the one-bit carry storage area requires a large number of processing steps including the step for shifting data to the carry storage area, the step for storage of the contents at the predetermined RAM address into the accumulator, the step for shifting the contents of the accumulator and the contents of the carry storage area to the accumulator, the step for storage of the contents of the accumulator into the predetermined RAM address and the step for storage of the change indicating signal into the accumulator. Accordingly, it requires lot of time for execution of one instruction. Since a sequence program usually includes several hundreds of words to several kilowords, a high-speed sequence control cannot be expected using the prior art approach.

The latter approach of allotting the one-bit data representing the change indicating signal and the result of the previous operation of the accumulator to one RAM address has a reduced number of processing steps including the step for advance of the pointer register by one, the step for storage of the contents of the accumulator into the address indicated by the pointer register and the step for storage of the change indicating signal into the accumulator. But, this approach uses only one bit for one word included in the RAM, which results in a poor efficiency of utilization of the RAM.

Further, each of the above approaches uses only one bit of the plural-bit arranged accumulator, which results in a poor efficiency of utilization of the accumulator.

SUMMARY OF THE INVENTION

The present invention concerns a sequence control apparatus using a microprocessor which uses one word as the unit for its processing of operations, one word being formed of a plurality of bits.

An object of the present invention is to provide such an apparatus which has a high processing speed.

Another object of the present invention is to provide such an apparatus in which the efficiency of utilization of a memory is not lowered.

A further object of the present invention is to provide such an apparatus which can improve the efficiency of utilization of an accumulator incorporated in the microprocessor.

In order to attain the above objects, a sequence control apparatus according to the present invention is characterized by provision of a pattern data generating means for interpreting instructions included in a program and for generating, in accordance with each of the instructions, pattern data which masks a specified bit(s) of data to be taken into the microprocessor, and a data synthesizing means for combining input data and the pattern data and sending the resulting composite data to the microprocessor.

With such a construction, when data is taken into the accumulator in the microprocessor, it is possible to provide a desired form to the data. In other words, if one bit of the accumulator is used as a bit for storing data from a process condition detecting instrument, the result of operation to be sent to a process controlling instrument, or the intermediate result of an operation which is being performed, the remaining bits of the accumulator can be used in a desired form. That is, in the sequence control apparatus mainly performing its processing of logical operations in terms of one bit as the unit therefor, other bits of the accumulator than the above-mentioned one bit can be used as a temporary storage area, which improves the efficiency of utilization of the accumulator. This also allows the great reduction of steps of storing intermediate results of operations in a RAM, which results in a high processing speed. The reservation of the intermediate results can be performed only by the shifting operation of the accumulator. Since the above-mentioned remaining bits of the accumulator can be used as a temporary storage area, the efficiency of utilization of the RAM can be correspondingly improved.

As mentioned above, in the present invention, the microprocessor is efficiently utilized in the sequence control apparatus.

Other features and advantages of the present invention will become apparent from the following description taken in conjunction with the accompanying drawings.

BRIEF DESCRIPTION OF THE DRAWINGS

FIG. 3 shows a concrete example of the pattern data generator shown in FIG. 1;

FIG. 4 shows a concrete example of the data synthesizer shown in FIG. 1; and

FIG. 5 is an explanatory view for illustrating processing steps of a STORE instruction which is performed in the sequence control apparatus according to the present invention.

DESCRIPTION OF THE PREFERRED EMBODIMENT

Figure 1:
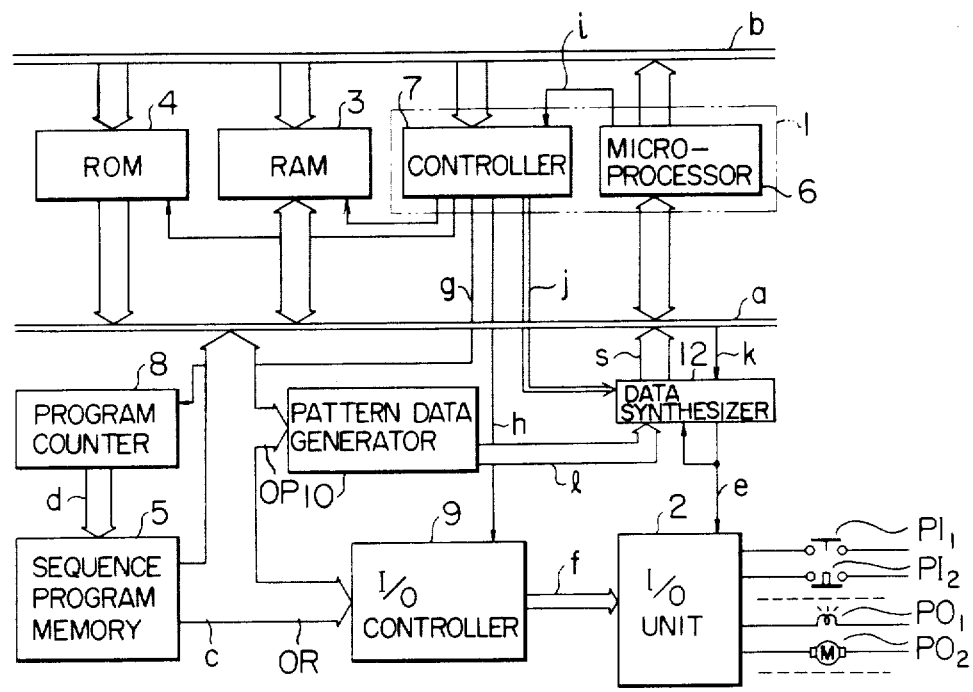
FIG. 1 is a block diagram showing an embodiment of a sequence control apparatus according to the present invention which uses a microprocessor performing its processing of operation in terms of one word as the unit therefor.

FIG. 1 shows in a block diagram a sequence control apparatus which uses a microprocessor performing its processing operation in units of one word, one word being formed of a plurality of bits.

In FIG. 1, reference numeral 1 designates an operation control unit, 2 an I/O unit including input and output parts, and 3, 4 and 5 memory units. The operation control unit 1 includes a microprocessor 6 which performs its processing operation in terms of one word as the unit therefor. The memory unit 4 is a read only memory (hereinafter referred to as a ROM) which stored therein a control program for controlling the microprocessor 6. The microprocessor 6 reads the control program out of the ROM 4 and performs various logical operations to effect a sequence control. The memory 3 is a random access memory (or RAM) which temporarily stores the intermediate result of the processing of operations in the microprocessor 6 or various data required for the processing of operations. The microprocessor 6 is connected to each of the RAM 3 and the ROM 4 through both a data bus a and an address bus b. Thus, the microprocessor 6 can read out the contents of the RAM 3 or ROM 4 and can write various data in the RAM 3. A controller 7 sends an appropriate timing signal to each unit or component on the basis of address information supplied from the microprocessor 6 through the address bus b and a command signal supplied from the same through a signal line i. The memory unit 5 is a sequence program memory which stores sequence programs each consisting of a combination of instructions such as the previously-mentioned STORE instruction, AND instruction, OR instruction, etc. A program counter 8 is counted up by a program advancing command signal supplied from the controller 7 through a signal line g so that the contents of the program counter 8 delivered on a bus d sequentially and cyclically specify the respective addresses of the sequence program memory 5 to allow the cyclical readout of each sequence program. The I/O unit 2 is connected to process condition detecting instruments and process controlling instruments. In more detail, the input part of the I/O unit 2 is connected to the process condition detecting instruments, for example, the contact $PI_1$ of a limit switch and the contact $PI_2$ of a push-button, and the output part of the I/O unit 2 is connected to the process controlling instruments, for example, a display $PO_1$ and a motor $PO_2$. Predetermined different addresses of the I/O unit 2 are assigned to the instruments connected to the unit 2 respectively. When the predetermined address of the I/O unit 2 is specified, the I/O unit 2 transmits the ON or OFF condition signal of the associated process condition detecting instrument to a bit data line e or bit data from the line e to the associated process controlling instrument. The bit data supplied through the bit data line e to the I/O unit 2 is the result of operation in the operation control unit 1. The transmission of this bit data to the process controlling instrument $PO_1$ or $PO_2$ results in the ON or OFF control of that instrument.

Figure 2:
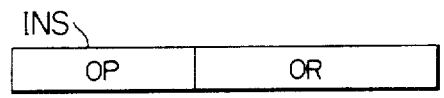
FIG. 2 shows the structure of each of instructions constructing a sequence program.

When an address of the sequence program memory 5 is specified by the program counter 8, one of the sequence programs forming instructions stored in the memory 5 at the specified address is delivered on a bus c. Each of the instructions INS forming the sequence program has a structure as shown in FIG. 2. That is, the instruction INS is formed of an operation part OP and an operand part OR. The operation part OP corresponds to the previously-mentioned STORE instruction, AND instruction, OR instruction, or the like. The operand part OR is a part for specifying an object to be operated and corresponds to one of the addresses of the I/O unit 2 which are previously assigned to the process condition detecting instruments and process controlling instruments. The operation part OP of the instruction read out of the sequence program memory 5 is applied to the operation control unit 1 through the data bus a. The operand part OR of the instruction read out of the memory 5 is applied to an I/O controller 9 which in turn delivers on a bus f a signal indicative of a desired address of the I/O unit 2 on the basis of a control signal supplied from the controller 7 through a control signal line h, thereby controlling the outputting of a signal from the I/O unit 2 to the process controlling instrument associated with the indicated I/O unit address or the inputting of a signal to the I/O unit 2 from the process condition detecting instrument associated with the indicated I/O unit address.

A pattern data generator 10 receives through a bus c the operation part OP of the instruction INS read out of the sequence program memory 5. Though the operation part OP may be applied to the pattern data generator 10 through the microprocessor 6, the illustrated direct application of the operation part OP to the pattern data generator 10 from the bus c is advantageous in providing a high processing speed. The pattern data generator 10 interprets the instruction INS and delivers predetermined pattern data in accordance with the result of such interpretation. The pattern data serves as data for masking a specified bit(s) of data which is to be applied to the microprocessor 6 in a later stage. The pattern data generator 10 having such a function can be formed by, for example, a non-volatile memory or ROM. FIG. 3 shows such an example of the pattern data generator 10. Referring to FIG. 3, a ROM 11 stores predetermined pattern data at each address which corresponds to the operation part OP of the instruction INS supplied from the sequence program memory 5. The data of the operation part OP is used as address specifying information which specifies an address of the ROM 11. In this way, the intended function of the pattern data generator 10 in FIG. 1 can be realized by the ROM 11. In the present embodiment, when a SHIFT instruction is read out of the sequence program memory 5, the pattern data generator 10 delivers pattern data "0000000". When an AND instruction is read out, the generator 10 delivers pattern data "1111111". The exemplified 7-bit pattern data is employed since the microprocessor 6 takes in 8-bit arrangement in the present embodiment. If a 16-bit microprocessor is used, the pattern data will consist of 15 bits. The pattern data output of the generator 10 is supplied to a data synthesizer 12.

The data synthesizer 12 combines pattern data supplied from the pattern data generator 10 through a bus l and the bit data supplied from the I/O unit 2 through the bit data line e, and supplies the resulting composite data to the data bus a through a bus s on the basis of a timing signal supplied from the controller 7 through a timing signal line j. In addition to these functions, the data synthesizer 12 in the present embodiment has the function of transmitting the result of operation in the microprocessor 6 to the I/O unit 2 as required. The result of operation is delivered from the microprocessor 6 on a one-bit signal line k of the data bus a. In general, the least significant bit of the data is used for this purpose. The data synthesizer 12 in the present embodiment has the additional function of transmitting this bit of data to the bit data line e to which the I/O unit 2 is connected. Such a transmission of the bit data is effected on the basis of a timing signal from the controller 7. The data synthesizer 12 having such functions can be constructed by a combination of gate circuits. FIG. 4 shows an example of the data synthesizer 12. Referring to FIG. 4, reference symbols IG1, IG2, . . . , IG(n−1) and IGn designate gate circuits, and the number of gate circuits is equal to eight when data processed in the microprocessor 6 is formed of eight bits. The input and output terminals of the gate circuit IG1 are connected to the data line e and a one-bit data line of the bus s respectively. The input terminal of each of the gate circuits IG2, . . . , IG(n−1) and IGn is connected to a corresponding one of the respective data bits on the bus l from the pattern data generator 10 while the output terminal thereof is connected to a corresponding one of the remaining data lines of the bus s. A gate circuit OG is used to transmit the result of operations in the microprocessor 6 to the I/O unit 2. The gate circuits OG and IG1 are connected in an anti-parallel fashion. In FIG. 1, the bit data line k is shown independently of the bus s for convenience of illustration. However, that bit data line of the bus s which is connected to the gate circuit IG1, may be used as the bit data line k, as shown in FIG. 4. When the bit data line k is provided independently of the bus s, the mere anti-parallel connection of the gate circuits OG and IG1 cannot be employed but it is required to provide the gate circuit OG independently of the gate circuit IG1. A timing signal bus j includes two signal lines v and w which send a data read-out signal and a data write-in signal respectively. The signal line v is connected to the gate control terminal of each of the gate circuits IG1, IG2, . . . and IGn while the signal line w is connected to the gate control terminal of the gate circuit OG. When the microprocessor 6 takes in data, the controller 7 supplies the data read-out signal to the signal line v on the basis of a command on the signal line i from the microprocessor 6 to enable the gate circuits IG1, IG2, . . . and IGn. On the other hand, when the result of operation is outputted from the microprocessor 6, the controller 7 supplies the data write-in signal to the signal line w on the basis of a command on the signal line i from the microprocessor 6 to enable the gate circuit OG.

In operation, the controller 7 applies a program advancing command signal to the program counter 8 on the basis of a command from the microprocessor 6 to advance the contents of the counter 8 in succession. As a result, the program counter 8 addresses the sequence program memory 5 so that sequence programs are sequentially and cyclically read out. When one sequence instruction INS is read out of the sequence program memory 5 on the basis of the addressing by the program counter 8, the microprocessor 6 takes in the operation part OP of the sequence instruction INS through the data bus a and performs a predetermined processing in accordance with a control program stored in ROM 4. The I/O controller 9 receives the operand part OR of the sequence instruction INS and specifies a desired address of the I/O unit 2 in accordance therewith. The I/O controller 9 also controls the inputting or outputting of a signal to or from an instrument corresponding to the specified address of the I/O unit 2, on the basis of a control signal supplied through the signal line h from the controller 7. In more detail, when the control signal indicates a signal inputting operation, the logical state of the instrument corresponding to the specified address is inputted from the instrument to the I/O unit 2 for transmittance to the bit data line e. On the other hand, when the control signal indicates a signal outputting operation, data on the bit data line e is transmitted from the I/O unit 2 to the instrument corresponding to the specified address. The pattern data generator 10 receives the operation part OP of the sequence instruction INS and supplies predetermined pattern data in accordance therewith. The pattern data is applied to the data synthesizer 12. In the case where the sequence instruction being processed requires receipt of data from the I/O unit 2, the microprocessor 6 supplies a command to the controller 7 through the signal line i so that the controller 7 supplies a read-out signal on the signal line v. As a result, the gate circuits IG1, IG2, . . . IGn included in the data synthesizer 12 are enabled. Thus, the data bus a from the data synthesizer 12 includes in a composite or synthesized data form the logical state signal of the instrument from the I/O unit 2 at the least significant bit position and the pattern data from the pattern data generator 10 at the remaining upper bit positions. The microprocessor 6 takes in the composite data on the data bus a, and then performs a predetermined processing. On the other hand, in the case where the sequence instruction being processed requires sending data to the I/O unit 2, the microprocessor 6 supplies a command to the controller 7 through the signal line i so that the controller 7 supplies a write-in signal on the signal line w. As a result, the gate circuit OG is enabled. Thus, the result of the previous operation which is placed on the least significant bit of data outputted from the microprocessor 6, or bit data which is required to be outputted, is supplied on the bit data line e through the gate circuit OG. When the processing of one sequence instruction is completed in the above-mentioned manner, the controller 7 supplies a program advancing command signal to the signal line g on the basis of a command on the signal line i from the microprocessor 6 so that the program counter 8 is advanced by one. Thus, the program counter 8 reads the next sequence instruction out of the sequence program memory 5.

In this way, the sequence instructions forming the sequence program are successively read out of the sequence program memory 5 and are processed. As a result, the process controlling instruments are subjected to their predetermined controls in accordance with the conditions of the process condition detecting instruments.

Now, the procedure of processing in the case where the sequence instruction read out of the sequence program memory 5 is a STORE instruction will be explained with reference to FIG. 5. As mentioned previously, the STORE instruction involves a requirement of taking a change indicating signal from a predetermined process condition detecting instrument into the accumulator while temporarily storing as an intermediate result the result of the previous operation which has been stored in the accumulator before the taking of the change indicating signal thereinto. In this case, the predetermined process condition detecting instrument as just referred to is one connected to that address of the I/O unit 2 which is specified by the operand OR part of the sequence instruction INS. On the other hand, in the present embodiment, the result of the previous operation is temporarily placed on the least significant bit of the accumulator incorporated in the microprocessor 6. When the instruction INS read out of the sequence program memory 5 is the STORE instruction, the microprocessor 6 operates to shift the contents of the accumulator ACC by one bit, thereby temporarily putting the logic "0" at its least significant bit (see Step 1 in FIG. 5). Thus, the result of the previous operation is temporarily placed on the second lowest bit which is one bit higher than the least significant bit. The pattern data generator 10 detects from the operation code OP that the sequence instruction INS is the STORE instruction, and delivers the predetermined pattern data "0000000". At approximately the same time, the I/O controller 9 operates so that the change indicating signal of logic "1" or "0" (hereinafter referred to x) from the instrument specified by the operand part OR is read out on the bit data line e. When the gate circuits IG1, IG2, . . . and IGn are enabled, the data synthesizer 12 delivers composite data "0000000x" on the data bus a. As illustrated by Step 2 in FIG. 5, the microprocessor 6 receives the composite data, produces a logical sum of the composite data "0000000x" and the contents (ACC) of the accumulator ACC, and then stores the result of this operation in the accumulator ACC. Thus, the accumulator ACC holds at the least significant bit position the change indicating signal representative of the logical state of the instrument specified by the operand part OR and at the remaining bit positions the data immediately after the above Step 1 has terminated. Namely, the result (shown by "a" in FIG. 5) of the operation which has been performed before the STORE instruction is executed, is temporarily held on the second lowest bit of the accumulator ACC.

As is apparent from the foregoing explanation, according to the present invention, the number of required processing steps can be greatly reduced. As a result, the processing speed in the sequence controlling apparatus is greatly improved. Further, since pattern data from the pattern data generator 10 can mask upper bits of the accumulator ACC, these upper bits can be used as a temporary storage area for the result of the previous operation, which allows an efficient utilization of the accumulator. The utilization of the accumulator as the temporary storage area also allows an expanded utilization of the RAM 3 for storage of other data, thereby improving the efficiency of utilization of the RAM 3.

If the instruction read out of the sequence program memory 5 is an AND instruction, the pattern data generator 10 generates pattern data "1111111" and the data synthesizer 12 generates composite data "1111111x". Though a logical product of the contents of the accumulator ACC and the composite data is produced, the bits of the accumulator other than the least significant bit hold the contents of the accumulator before the logical product is produced while only the least significant bit of the accumulator is replaced by the bit data from the I/O unit 2. If the instruction read out of the sequence program memory 5 is an OR instruction, the pattern data generator 10 generates pattern data "0000000" and the data synthesizer 12 generates composite data "0000000x". It will be understood that though a logical sum of the contents of the accumulator and the composite data is produced, the bits of the accumulator other than the least significant bit hold their contents before the logical sum is produced.

In the above-described embodiment, the bit data supplied from or to the I/O unit 2 has been placed on the least significant bit line of the data bus a. However, any predetermined bit line may be used for that purpose. Also, though the microprocessor 6 has been described to take an 8-bit arrangement, the present invention is applicable to a microprocessor having any bit arrangement such as 4 bits, 16 bits, etc. Further, the embodiment has been explained in conjunction of a one-bit operation by way of an example. However, the present invention is applicable to the case of any plural-bit operation so long as the plural bits are smaller in number than the bits forming data in the microprocessor. This can be easily carried out in such a manner that the gate circuit IG1 for taking in data from the I/O unit 2 as well as the gate circuit OG for delivering data to the I/O unit 2 is increased in number by the increased bit number and the gate circuits IG2, . . . and IGn for gating the pattern data are correspondingly decreased in number while the arrangement of the pattern data is correspondingly changed.

A variety of other modifications will be made without departing from the spirit and scope of the present invention. Therefore, the present invention should be not limited to the disclosed and specified particulars but is widely covered by the scopes defined in the appended claims.

We claim:

1. A sequence control apparatus comprising:
    (a) means including a program memory for storing a sequence program made up of a combination of instructions each of which has an operation part and an operand part and consists of a plurality of bits, said sequence program serving to control a multiplicity of output instruments into predetermined conditions in response to condition signals produced from a multiplicity of input instruments; and (b) operation processing means for sequentially reading out said instructions from said program memory, for sequentially taking in the condition signals of designated ones of said input instruments in accordance with said sequence program and for controlling said output instruments into said predetermined conditions in response to the condition signals received from said input instruments, including (b−1) a microprocessor having an accumulator for temporarily storing data made up of a plurality of bits, said microprocessor including means for performing predetermined processing operations on words having a predetermined plural numcer of bits in accordance with the operation part of a read out instruction, (b−2) pattern data generating means for generating pattern data having a predetermined bit arrangement corresponding to the processing operation required by the operation part of each instruction read out from said program memory, the number of bits of said pattern data being less than the bit capacity of said accumulator and (b−3) data synthesizing means for forming the pattern data generated from said pattern data generating means and the condition signal received from one of said input instruments designated by an operand part of an instruction, in response to the operation part of which instruction said pattern data is generated from said pattern data generating means, and including means for sending the resulting composite data to said microprocessor in the form of plural bits corresponding in number to the bit capacity of said accumulator and for storing said composite data in said accumulator, the predetermined bit arrangement of said pattern data generated by said pattern data generating means being such that the values of the bits present in said accumulator and corresponding in position to the respective bits of said pattern data are not changed from the result required by the logical operation called for by said instruction when said composite data is stored in said accumulator.

2. A sequence control apparatus according to claim 1, further including means for shifting the data in said accumulator so that those bit positions of said accumulator corresponding to the bit positions of said pattern data in said composite data serve as a save storage area for temporarily storing the result of the previous operation in the course of the execution of said sequence program.

3. A sequence control apparatus according to claim 2, further including means for inserting the condition signal of said input instrument or the data produced in the course of said predetermined operation processing at one extreme bit position of said accumulator after the data previously stored in said accumulator is temporarily stored at the other bit positions of said accumulator through said shifting operation of said accumulator.

4. A sequence control apparatus according to claim 1, wherein said pattern data generating means includes an addressable memory in which said pattern data is stored at storage locations having respective addresses corresponding to the address specified by the operation part of each instruction of said sequence program.

5. A sequence control apparatus according to claim 4, wherein said addressable memory is a read only memory.

6. A sequence control apparatus according to claim 1, wherein said pattern data generating means is connected to directly receive the operation part of each instruction from said program memory.

7. A sequence control apparatus according to claim 1, wherein said data synthesizing means includes a plurality of input gate circuits which are enabled upon taking-in of data and which are equal in number to the number of data bits in a word processed by said microprocessor, one of said plural input gate circuits being connected to gate the condition signal of said input instrument and the other input gate circuits being connected to gate said pattern data.

8. A sequence control apparatus according to claim 7, wherein said data synthesizing means further includes an output gate circuit enabled upon outputting of data and connected in anti-parallel relationship with said one input gate circuit.

* * * * *